(12) United States Patent
Oh et al.

(10) Patent No.: US 7,815,154 B2
(45) Date of Patent: Oct. 19, 2010

(54) SUPPORTING DEVICE FOR DISPLAY UNIT

(75) Inventors: Seung Hoon Oh, Yongin-Si (KR); Sun Jin Kim, Suwon-Si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 768 days.

(21) Appl. No.: 11/653,381

(22) Filed: Jan. 16, 2007

(65) Prior Publication Data

US 2007/0262210 A1 Nov. 15, 2007

(30) Foreign Application Priority Data

May 9, 2006 (KR) ...................... 10-2006-0041423

(51) Int. Cl.
*F16M 11/04* (2006.01)
(52) U.S. Cl. .................................................. 248/176.3
(58) Field of Classification Search ............. 248/125.1, 248/125.8, 408, 423, 919, 920, 921, 922; 361/679.02, 679.05, 679.21
See application file for complete search history.

(56) References Cited

U.S. PATENT DOCUMENTS

2004/0069913 A1* 4/2004 Martens ...................... 248/161

2006/0219849 A1* 10/2006 Chiu ........................ 248/125.8

FOREIGN PATENT DOCUMENTS

KR         10-0565686 B1        3/2006

* cited by examiner

*Primary Examiner*—J. Allen Shriver, II
*Assistant Examiner*—Erin Smith
(74) *Attorney, Agent, or Firm*—Sughrue Mion, PLLC

(57) ABSTRACT

A supporting device for a display unit for rotating a display screen to be oriented vertically. The supporting device includes a fixed member mounted on a base, an elevating member secured to the fixed member to be lifted or lowered, a pivot bracket rotatably coupled to an upper end of the elevating member while being secured to a rear surface of the display unit, an operating lever having an upper portion rotatably coupled to the upper end of the elevating member, a holder formed at the fixed member to allow the operating lever to be caught therein when being rotated rearward in a lifted state of the elevating member, a horizontally movable member secured to the upper end of the elevating member, and a cam portion formed at the pivot bracket.

17 Claims, 8 Drawing Sheets

SUPPORTING DEVICE FOR DISPLAY UNIT

CROSS-REFERENCE TO RELATED APPLICATION

This application claims priority from Korean Patent Application No. 2006-0041423, filed on May 9, 2006 in the Korean Intellectual Property Office, the disclosure of which is incorporated herein by reference.

BACKGROUND OF THE INVENTION

1. Field of the Invention

The present invention relates to a supporting device for display units and, more particularly, to a supporting device for display units, which can regulate a height of the display unit and rotate the display unit.

2. Description of the Related Art

Generally, a supporting device for a flat panel display unit, such as a liquid crystal display (LCD) or plasma display panel (PDP), functions to regulate the height and viewing angle of a display screen. The supporting device also functions to rotate the display screen to be vertically or horizontally oriented, i.e. rotating the display screen vertically or horizontally, as occasion demands.

Korean Patent Registration Publication No. 10-565686 discloses an example of a supporting device for a display unit capable of regulating a height and viewing angle of a display screen and rotating the screen vertically or horizontally.

The disclosed supporting device includes an upright stand body, an elevating unit installed to be lifted or lowered along the stand body, and a pivot bracket coupled to an upper end of the elevating unit to rotate about a pivot shaft while being secured to a rear surface of an image display unit. The supporting device further includes a locking unit to fixedly maintain the elevating unit in a lifted state or release the fixed state of the elevating unit, and an operating unit to operate the locking unit in accordance with rotation of the pivot bracket when the image display unit is rotated to be vertically or horizontally oriented, i.e. rotated horizontally or vertically. However, because of the above described configuration, the image display unit may be rotated to be vertically oriented only after a height thereof is raised. Also, once the image display unit is vertically oriented, lowering the height of the image display unit is restricted, so as to prevent the image display unit from colliding with a desk, etc.

Additionally, the above described conventional supporting device has a problem in that the locking and operating units, which are used to restrict vertical orientation and height lowering of the image display unit, have a great number of constituent elements, and the connection and arrangement relationship between the elements are very complex, resulting in manufacturing difficulties and high manufacturing costs.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

It is an aspect of the invention to provide a supporting device for a display unit which can allow a display screen to be rotated so as to be vertically oriented, i.e. rotated vertically only after a height of the screen is raised, and restrict lowering of the height once the screen is vertically rotated while achieving a simplified configuration.

Consistent with one aspect, an exemplary embodiment of the present invention provides a supporting device for a display unit comprising: a fixed member mounted on a base; an elevating member secured to the fixed member to be lifted or lowered; a pivot bracket rotatably connected to an upper end of the elevating member while being secured to a rear surface of the display unit; an operating lever having an upper portion rotatably coupled to the upper end of the elevating member; a holder formed at the fixed member to allow the operating lever to be caught therein when being rotated rearward in a lifted state of the elevating member; a horizontally movable member secured to the upper end of the elevating member and adapted to move forward and rearward so as to rotate the operating lever; and a cam portion disposed on one of the pivot bracket and the display unit to cause the forward and rearward movements of the horizontally movable member when the pivot bracket is rotated.

The supporting device may further comprise an elastic member to move the horizontally movable member toward the cam portion.

The cam portion may have a protruding surface protruded from a rear surface of the pivot bracket, and the horizontally movable member may have a roller to perform a rolling motion while coming into contact with the protruding surface.

The holder may have: a holding space protruded rearward from an inner surface of an upper end the fixed member to allow a lower end of the operating lever to move rearward; and a supporting surface defining the bottom of the holding space to support the lower end of the operating lever.

The supporting device may further comprise an elastic member to move the operating lever in a direction of being released from the holder.

The supporting device may further comprise a connecting member having a rear end secured to the upper end of the elevating member and adapted to pivotally rotate up and down about the upper end of the elevating member and a front end pivotally connected to the pivot bracket.

The rear end of the connecting member may be adapted to pivotally rotate up and down about a pair of hinged shafts installed on the upper end of the elevating member to regulate a slant of the display screen and the front end of the connecting member is pivotally connected to the pivot bracket by use of a pivot shaft that is disposed in a direction intersecting with the hinged shafts.

The upper portion of the operating lever may be rotatably coupled to the hinge shafts.

Consistent with another aspect, an exemplary embodiment of the present invention provides a supporting device for a display unit comprising: a fixed member mounted on a base; an elevating member secured to the fixed member to be lifted or lowered; a pivot bracket rotatably connected to an upper end of the elevating member while being secured to a rear surface of the display unit; an operating lever having an upper portion coupled to the upper end of the elevating member to allow forward and rearward movements of the operating lever and a lower portion extending downward by a long distance; a holder formed at the fixed member to allow the operating lever to be caught therein when being moved rearward in a lifted state of the elevating member; a horizontally movable member secured to the upper end of the elevating member and adapted to move forward and rearward so as to move the operating lever forward and rearward; and a cam portion disposed on the pivot bracket or the display unit to cause the forward and rearward movements of the horizontally movable member when the pivot bracket is rotated.

The operating lever may have a pair of elongated longitudinal coupling slots formed in the upper portion thereof, to be coupled to the hinge shafts so as to move forward and rearward.

Additional aspects of the invention will be set forth in part in the description which follows and, in part, will be obvious from the description, or may be learned by practice of the invention.

BRIEF DESCRIPTION OF THE DRAWINGS

These and/or other aspects of the exemplary embodiments of the invention will become apparent and more readily appreciated from the following description of the exemplary embodiments, taken in conjunction with the accompanying drawings, of which.

DETAILED DESCRIPTION OF THE EXEMPLARY EMBODIMENTS

Figure 1:
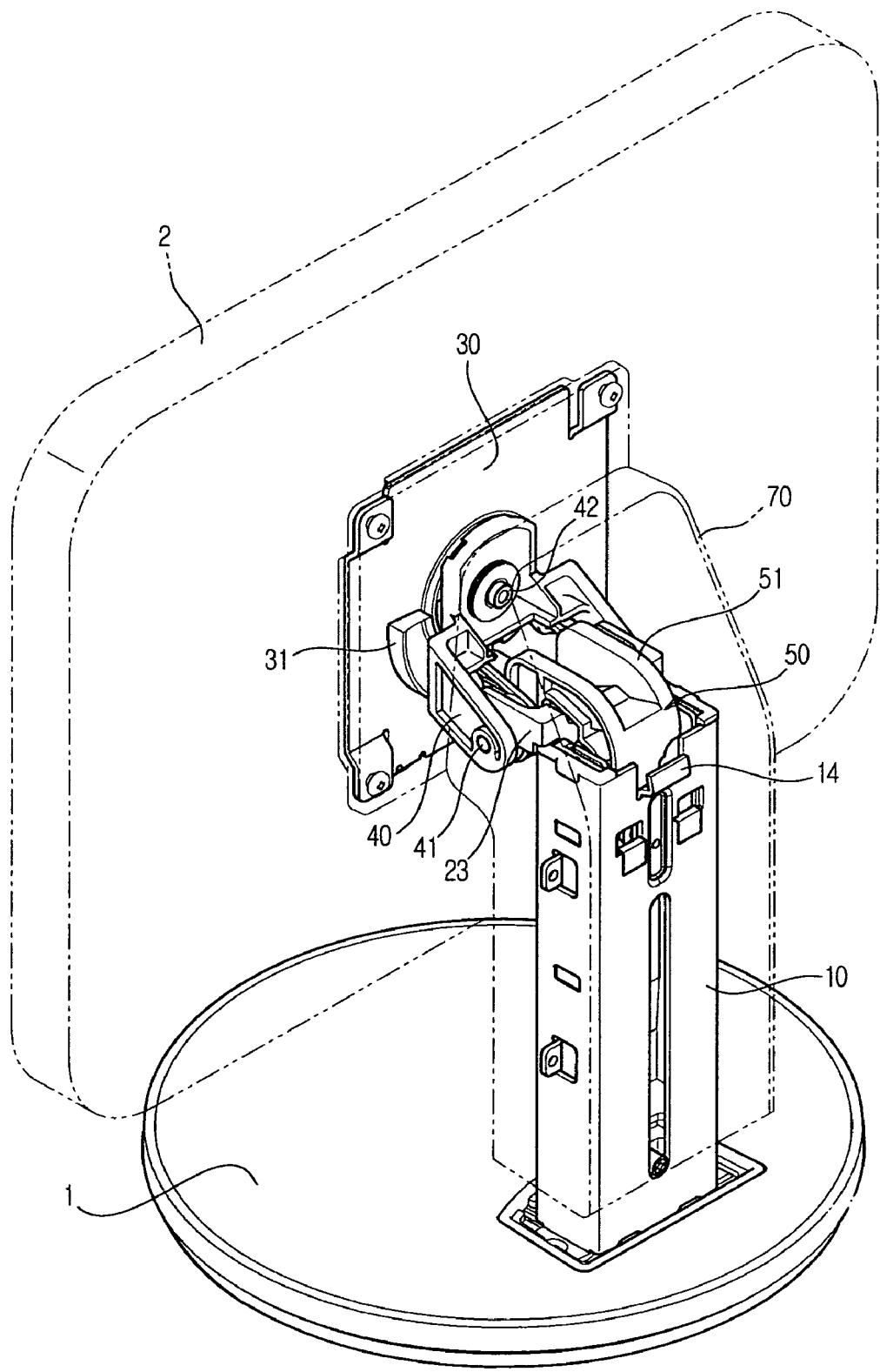
FIG. 1 is a perspective view illustrating a supporting device for a display unit according to a first exemplary embodiment of the present invention.

Reference will now be made in detail to exemplary embodiments of the present invention, examples of which are illustrated in the accompanying drawings, wherein like reference numerals refer to like elements throughout. The embodiments are described below to explain the present invention by referring to the figures.

Figure 2:
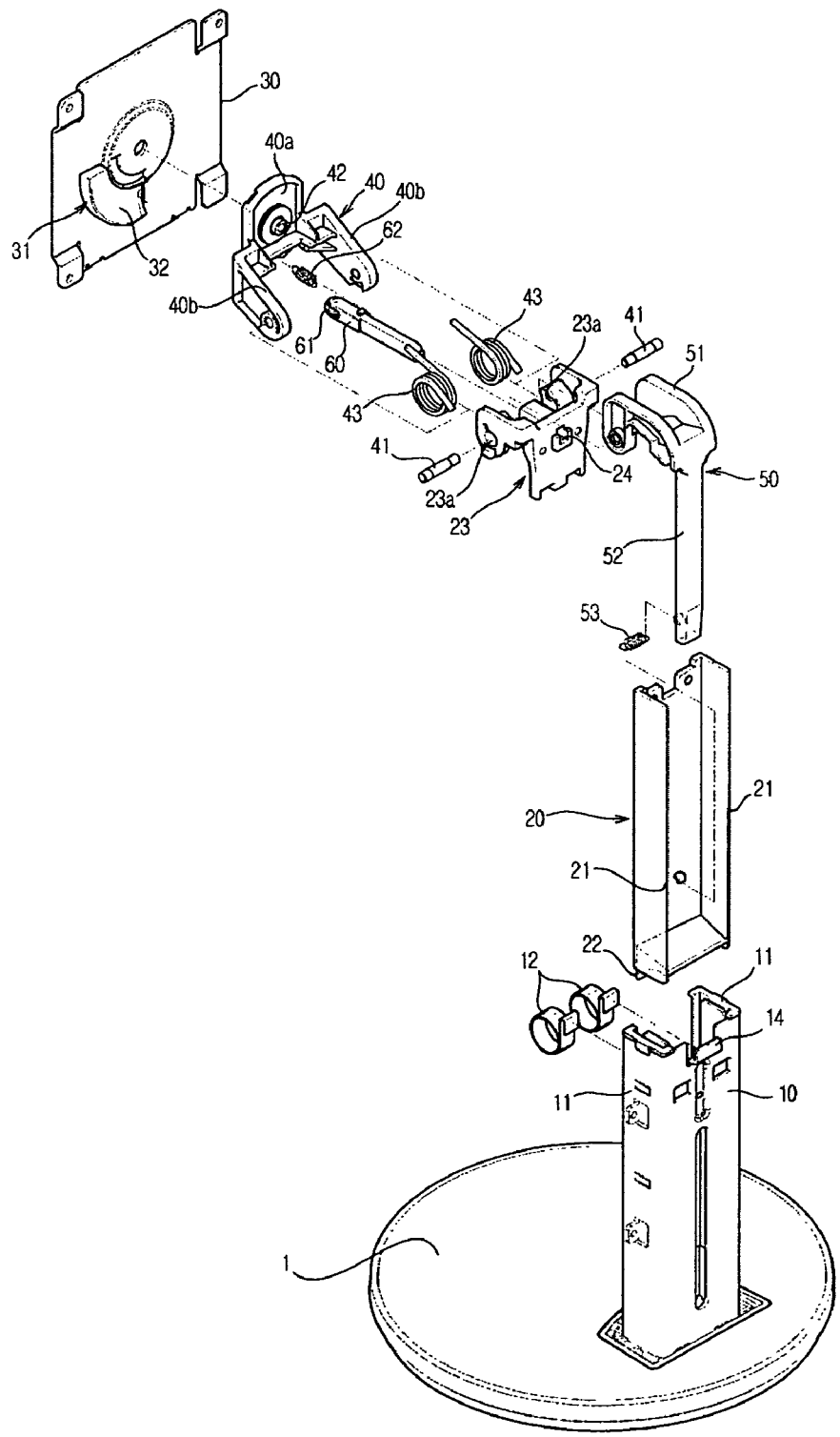
FIG. 2 is an exploded perspective view illustrating detailed configuration of the supporting device for a display unit according to the first exemplary embodiment of the present invention.

FIGS. 1 to 6 illustrate a supporting device for a display unit according to a first exemplary embodiment of the present invention. The supporting device of the first exemplary embodiment, as shown in FIGS. 1 and 2, includes a fixed member 10 mounted on a base 1, an elevating member 20 secured to the fixed member 10 to be lifted or lowered, a pivot bracket 30 secured to a rear surface of a display unit 2, and a connecting member 40 adapted to connect an upper end of the elevating member 20 to the pivot bracket 30. In FIG. 1, reference numeral 70 denotes a cover for encasing the supporting device.

The fixed member 10 is secured, at a lower end thereof, to an upper surface of the base 1 and stands upright to have a long vertical length. The fixed member 10 includes first rail portions 11 to guide lifting and lowering of the elevating member 20 while being coupled to the elevating member 20. Similar to the fixed member 10, the elevating member 20 has a long vertical length, and includes second rail portions 21 correspondingly coupled to the first rail portions 11 of the fixed member 11. The first rail portions 11 of the fixed member 10 and the second rail portions 21 of the elevating member 20 may be directly coupled to each other to perform a relative sliding motion. Although not shown in the drawings, a plurality of balls or rollers may be interposed between the first and second rail portions 11 and 21 for the sake of smooth lifting and lowering of the elevating member 20.

Figure 3:
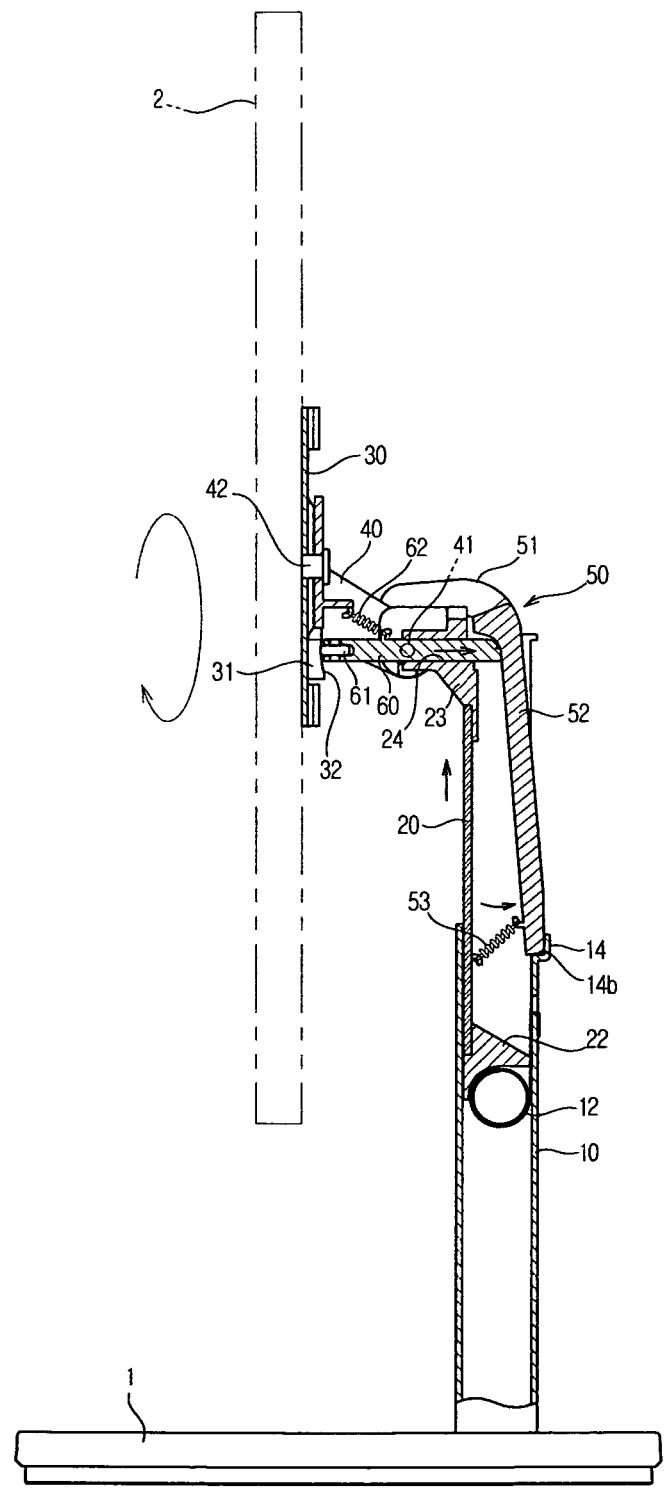
FIG. 3 is a sectional view of the supporting device for a display unit according to the first exemplary embodiment of the present invention, illustrating a vertically oriented state of the display unit having a raised height.

As shown in FIGS. 2 and 3, a pair of lift springs 12 is installed in a space between the fixed member 10 and the elevating member 20 to provide the elevating member 20 with a lifting force. Each lift spring 12 takes the form of an elastic windup spring for performing an upward winding and moving motion, and has one end fixed to an upper location of a rear surface of the fixed member 10. The elevating member 20 is provided with a pair of spring latches 22. Each spring latch 22 is configured to be latched to a winding portion of the associated lift spring 12 such that the lift spring 12 is wound or unwound according to the lifting and lowering behavior of the elevating member 20.

The lift springs 12 normally act to push up the spring latches 22, thereby providing the elevating member 20 with a lifting force. In particular, the lift springs 12 push up the elevating member 20 with a force corresponding to the weight of the display unit 2, thereby allowing a user to easily regulate a height of the elevating member 20. For this, a lowering force of the elevating member 20 caused by the weight of the display unit 2 may be balanced with the lifting force of the lift springs 12. Herein, although the windup springs are provided as one example of the lift springs 12, it should be understood that the lift springs 12 are not limited to this configuration. As for the lift springs 12, any other members, for example, conventional tension coil springs, compression coil springs, or the like, may be used to provide the elevating member 20 with a lifting force.

The connecting member 40, as shown in FIG. 2, serves to connect the upper end of the elevating member 20 to the pivot bracket 30. The connecting member 40 includes a first connecting portion 40a coupled to a rear surface of the pivot bracket 30, and a pair of second connecting portions 40b extending rearward from opposite lateral sides of the first connecting portion 40a to be coupled to an intermediate connecting member 23 that is located at the upper end of the elevating member 20. The first connecting portion 40a is rotatably coupled, at a central portion thereof, to the rear surface of the pivot bracket 30 by use of a pivot shaft 42. Also, the second connecting portions 40b are rotatably coupled, at rear ends thereof, to opposite lateral sides of the intermediate connecting member 23 by use of two hinge shafts 41 such that the second connecting portions 40b are pivotally rotated up and down about the two hinge shafts 41. Here, the hinge shafts 41 are arranged in a direction of intersecting with the pivot shaft 42.

The intermediate connecting member 23 has a pair of shaft coupling holes 23a perforated through opposite lateral walls of an upper portion thereof for the coupling of the two hinge shafts 41. A lower portion of the intermediate connecting member 23 is fastened to the upper end of the elevating member 20 by use of fixing screws, etc. A pair of torsion springs 43 is secured at locations of the intermediate connecting member 23 where the hinge shafts 41 are coupled. The torsion springs 43 serve to rotate the connecting member 40 upward in order to prevent droop of the connecting member 40 due to the weight of the display unit 2. Although FIG. 2 illustrates the hinge shafts 41 as being secured to the intermediate connecting member 23 on the upper end of the elevating member 20, the hinge shafts 41 may be directly coupled to the upper end of the elevating member 20.

With this configuration, a rear end of the connecting member 40 is pivotally rotatable up and down about the hinge shafts 41, thus enabling regulation in a slant of a screen of the display unit 2. Also, a front end of the connecting member 40 is coupled to the pivot bracket 30 to rotate the pivot bracket 30 about the pivot shaft 42, thus enabling the screen of the display unit 2 to be rotated so as to be vertically or horizontally oriented, i.e. vertically or horizontally rotated. Thereby, the connecting member 40 is able to realize tilting and pivoting functions.

The supporting device of this exemplary embodiment may also include a mechanism for rotating the screen of the display unit 2 vertically only when the elevating member 20 is lifted and also, restricting the height regulation of the screen when the screen is vertically oriented. The mechanism includes an operating lever 50 having an upper portion rotatably coupled to the upper end of the elevating member 20, a holder 14 provided at an upper end of the rear surface of the fixed member 10 to allow a lower end of the operating lever 50 to be caught by the holder 14, and a horizontally movable member 60 adapted to move forward and rearward in accordance with rotation of the pivot bracket 30 so as to press or release the operating lever 50.

The operating lever 50 has a connecting portion 51 rotatably coupled to the pivot shafts 41 above the elevating member 20, and an extension 52 extending downward from the connecting portion 51 by a long distance. The horizontally movable member 60 is installed above the elevating member 20 to move forward and rearward such that a front end thereof comes close to the rear surface of the pivot bracket 30 and a rear end thereof comes close to the extension 52 of the operating lever 50. That is, the horizontally movable member 60 penetrates through a hole 24 through the intermediate connecting member 23.

The pivot bracket 30 is formed at the rear surface thereof with a cam portion 31 having a generally arched shape. The cam portion 31 has a protruding surface 32 rearwardly protruded from the rear surface of the pivot bracket 30 to cause forward and rearward movements of the horizontally movable member 60 upon rotation of the pivot bracket 30. When the screen of the display unit 2 is horizontally oriented such that a long axis thereof is oriented horizontally, the front end of the horizontally movable member 60 is able to disengage with the cam portion 31. On the other hand, when the screen of the display unit 2 is vertically oriented such that the long axis thereof is oriented vertically, the front end of the horizontally movable member 60 comes into contact with the protruding surface 32 of the cam portion 31.

The front end of the horizontally movable member 60 is provided with a roller 61. The roller 61 performs a rolling motion while coming into contact with the cam portion 31, thereby achieving smooth forward and rearward movements of the horizontally movable member 60 in accordance with rotation of the pivot bracket 30. A first spring 62 is disposed on the horizontally movable member 60 to move the horizontally movable member 60 toward the cam portion 31. The first spring 62 has one end secured to an upper surface of the horizontally movable member 60 and the other end secured to the front end of the connecting member 40, so as to pull the horizontally movable member 60 toward the cam portion 31. With this configuration, when the long axis of the screen of the display unit 2 is oriented vertically, i.e. the screen of the display unit 2 is rotated vertically, the horizontally movable member 60 moves rearward to press the operating lever 50. Also, when the long axis of the screen of the display unit 2 is oriented horizontally, i.e. the screen of the display unit 2 is rotated horizontally, the horizontally movable member 60 moves forward to release the operating lever 50.

Figure 6:
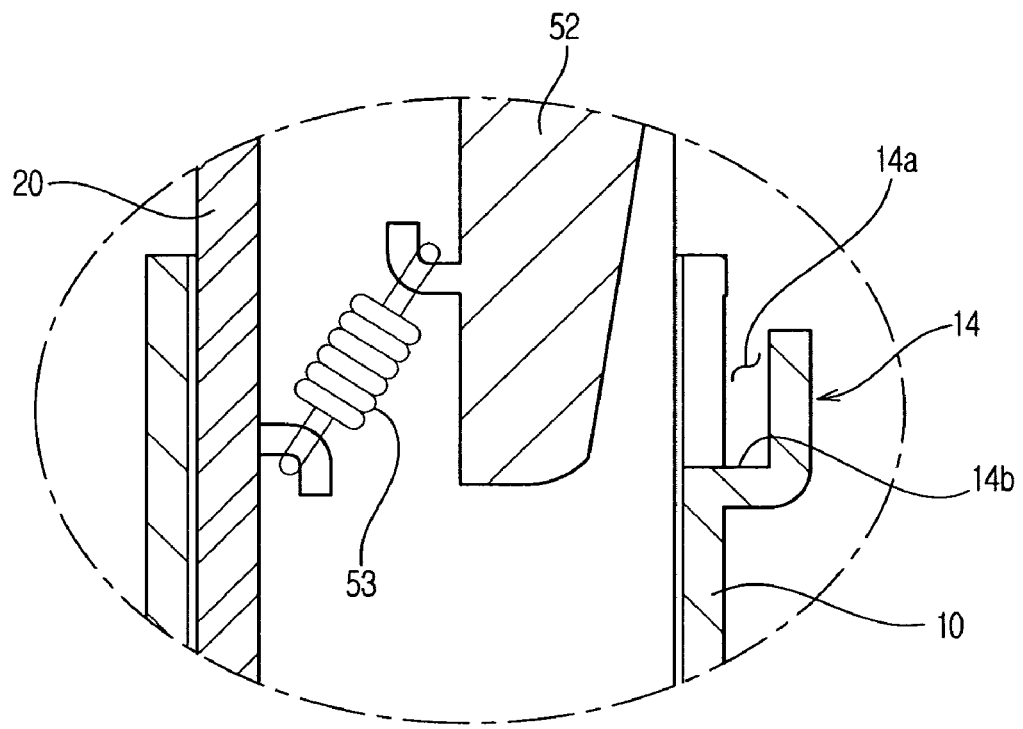
FIG. 6 is a detailed view of the oval VI of FIG. 4.

The holder 14, as shown in FIG. 6, is formed at the upper end of the rear surface of the fixed member 10 to allow a lower end of the extension 52 of the operating lever 50 to be caught by the holder 14 when the elevating member 20 is lifted. The holder 14 has a holding space 14a protruding rearward from an inner surface of the upper end of the fixed member 10 to allow the lower end of the extension 52 of the operating lever 50 to move rearward into the holding space 14a when the operating lever 50 is rotated rearward in accordance with behavior of the horizontally movable member 60. The holder 14 further has a supporting surface 14b defining the bottom of the holding space 14a to support the lower end of the extension 52.

The extension 52 of the operating lever 50 is mounted with a second spring 53. The second spring 53 serves to pull the extension 52 forward so as to release the extension 52 from the holder 14 when the operating lever 50 is not pressed by the horizontally movable member 60. The second spring 53 has one end connected to the extension 52 and the other end connected to the elevating member 20 to pull the extension 52 forward.

Now, operation of the supporting device having the above described configuration will be explained.

As shown in FIG. 3, if the screen of the display unit 2 is rotated to be vertically oriented, i.e. vertically rotated in a lifted state of the elevating member 20, simultaneously, the pivot bracket 30 is rotated. In accordance with rotation of the pivot bracket 30, the cam portion 31 formed at the rear surface of the pivot bracket 30 comes into contact with the front end of the horizontally movable member 60 and, thus, the horizontally movable member 60 is moved rearward. Thereby, as the rear end of the horizontally movable member 60 pushes the operating lever 50 rearward, the operating lever 50 is rotated rearward. With this behavior of the operating lever 50, the lower end of the extension 52 of the operating lever 50 is introduced into the holder 14 formed at the upper end of the fixed member 10, to thereby be caught by the holder 14. As a result, while the extension 52 of the operating lever 50 is caught by the holder 14, lowering of the elevating member 20 is restricted.

Figure 4:
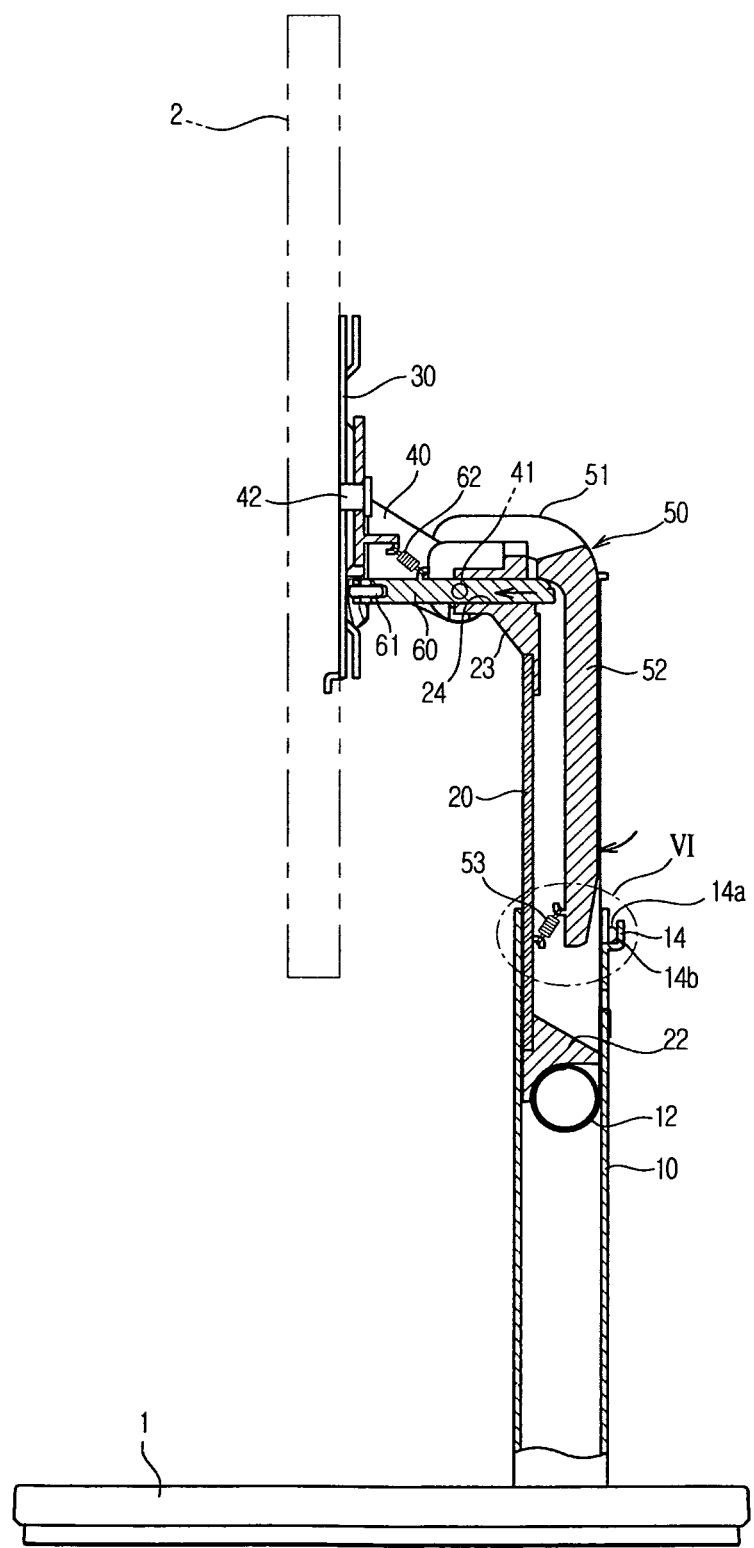
FIG. 4 is a sectional view of the supporting device for a display unit according to the first exemplary embodiment of the present invention, illustrating a horizontally oriented state of the display unit having a raised height.

As shown in FIG. 4, if the screen of the display unit 2 is rotated to be horizontally oriented, i.e. vertically rotated in a lifted state of the elevating member 20, the front end of the horizontally movable member 60 is disengaged with the cam portion 31. Accordingly, the horizontally movable member 60 is moved forward by the elasticity of the first spring 62, and therefore, the operating lever 50 is not pressed by the horizontally movable member 60. Subsequently, the operating lever 50 is rotated forward by the elasticity of the second spring 53, thereby causing the lower end of the extension 52 to be released from the holder 14. That is, as the extension 52 of the operating lever 50 is moved from the holder 14 into the elevating member 20, the lower end of the extension 52 is released from the holder 14. In this case, the elevating member 20 is able to be lifted or lowered and, thus, the height regulation of the elevating member 20 is possible.

Figure 5:
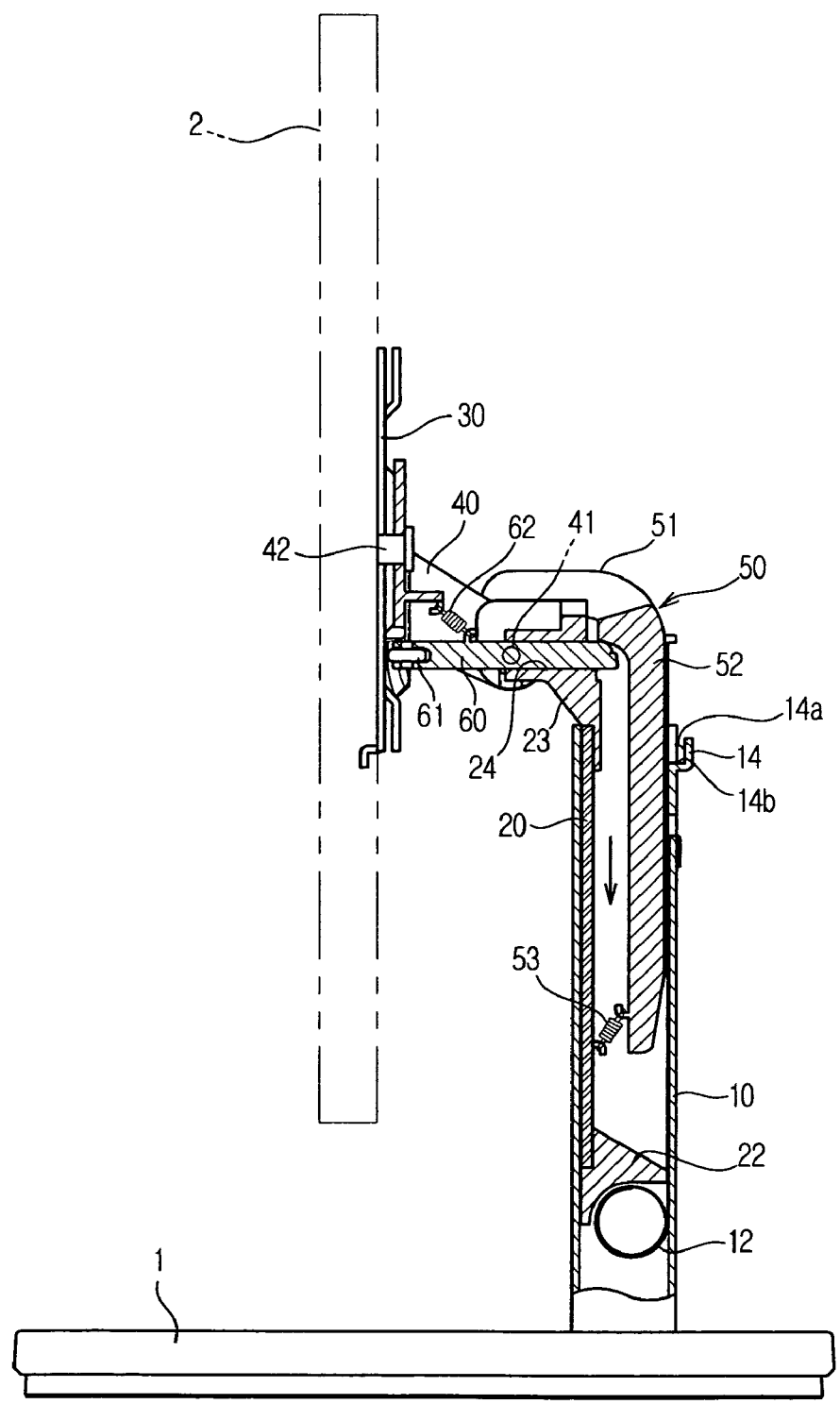
FIG. 5 is a sectional view of the supporting device for a display unit according to the first exemplary embodiment of the present invention, illustrating a height lowered state of the horizontally oriented display unit.

As shown in FIG. 5, when the elevating member 20 is lowered in a state wherein the screen of the display unit 2 is oriented horizontally, rotating the screen of the display unit 2 vertically is not allowed. In such a lowered state of the elevating member 20, since the extension 52 of the operating lever 50 is located in the fixed member 10 such that a rear surface of the extension 52 is supported by the inner surface of the fixed member 10, rearward rotation of the operating lever 50 is restricted. Accordingly, the horizontally movable member 60 cannot move rearward, and the front end of the horizontally movable member 60 is caught by one side of the cam portion 31. This restricts rotation of the pivot bracket 30 and, consequently, makes it impossible to rotate the screen of the display unit 2 vertically. Accordingly, this exemplary embodiment of the present invention has the effect of preventing the screen of the display unit 2 from being rotated vertically in a lowered state of the elevating member 20 and, therefore, there is no risk of damage to the display unit 2 due to collision with a desk, etc.

Figure 7:
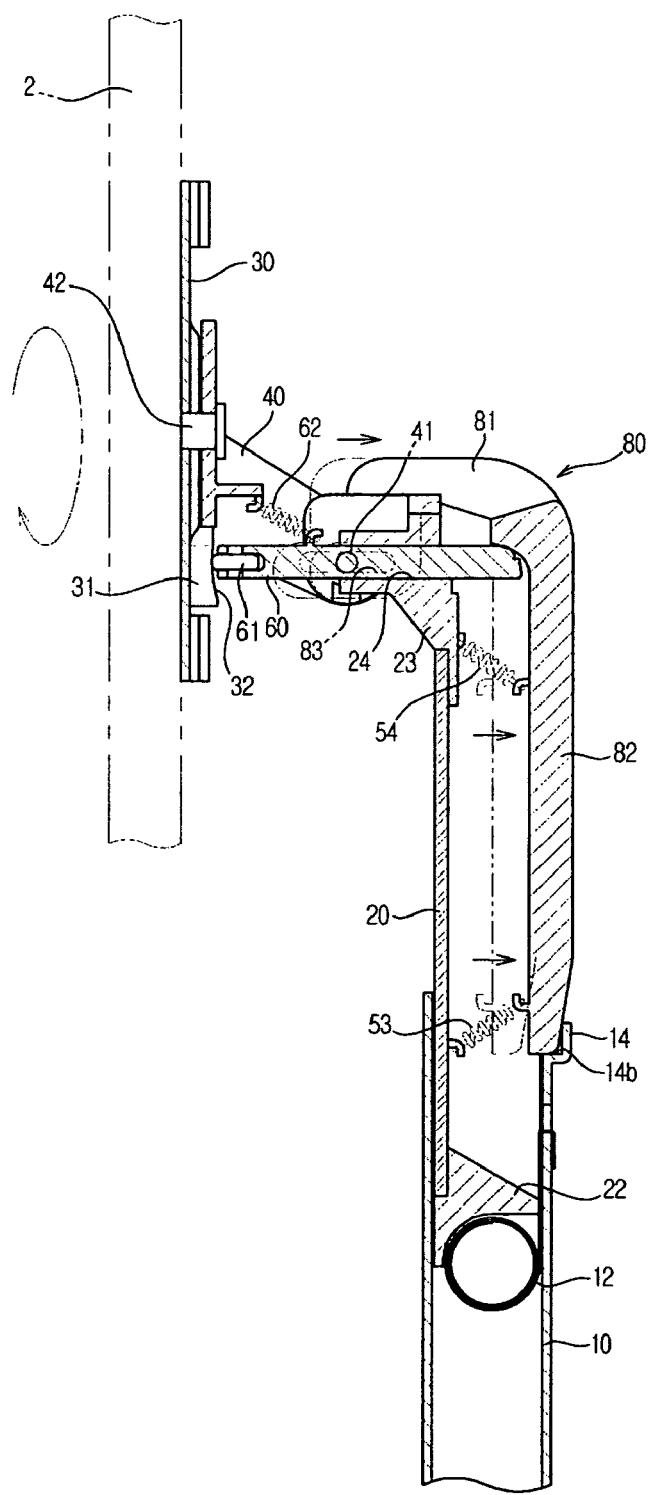
FIG. 7 is a sectional view of a supporting device for a display unit according to a second exemplary embodiment of the present invention.
Figure 8:
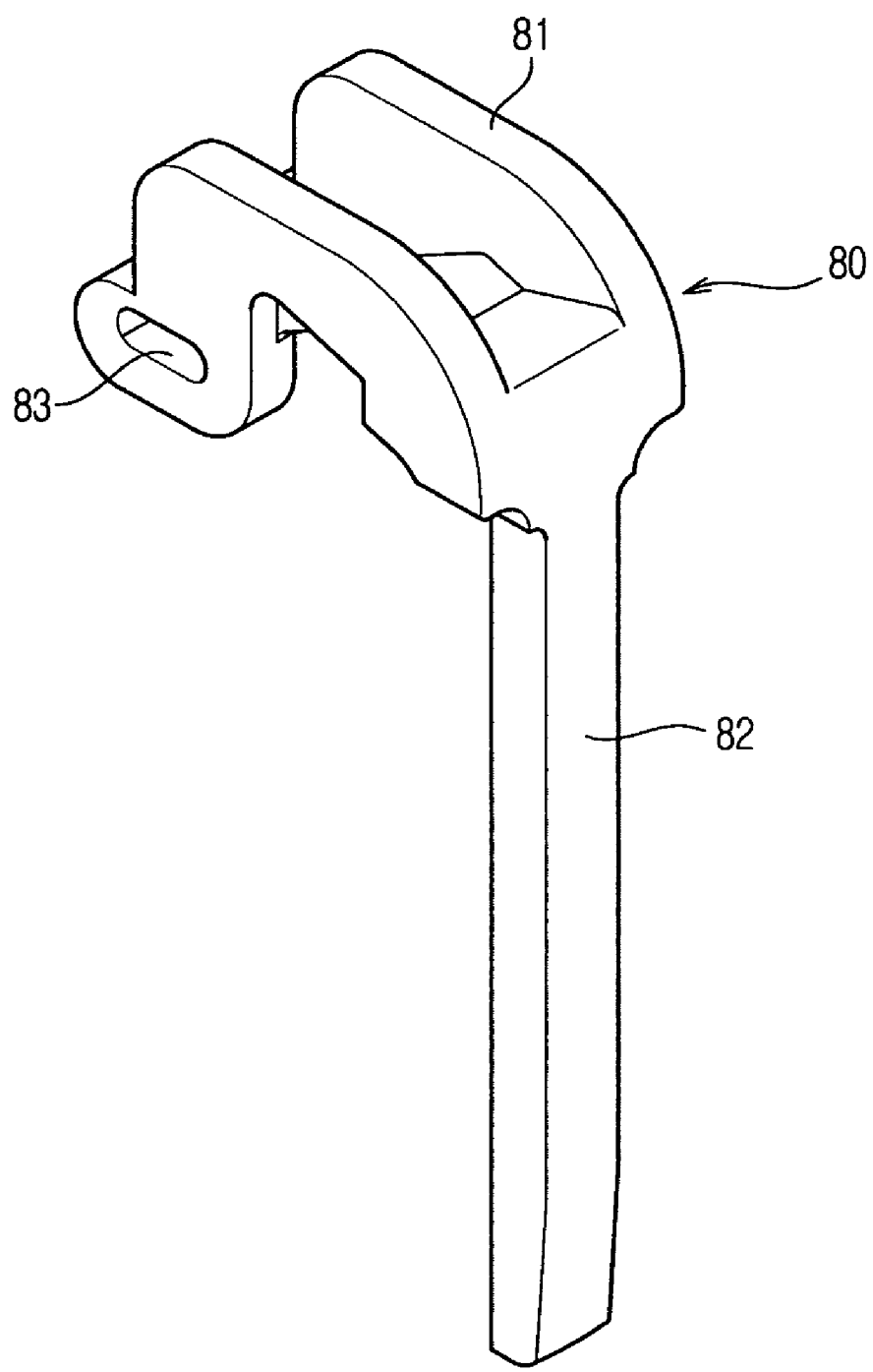
FIG. 8 is a perspective view illustrating an operating lever included in the supporting device for a display unit according to the second exemplary embodiment of the present invention.

FIGS. 7 and 8 illustrate a supporting device according to a second exemplary embodiment of the present invention. In the second exemplary embodiment, an operating lever 80 is configured to perform forward and rearward movements, rather than being rotated, when the horizontally movable member 60 is moved forward and rearward. For this, a connecting portion 81 of the operating lever 80 is formed with a pair of elongated longitudinal coupling slots 83 such that the hinge shafts 41 are coupled through the coupling slots 83. Also, an extension 82 of the operating lever 80 is provided with a third spring 54 at an upper location thereof, in addition to the second spring 53 provided at a lower location thereof.

Similar to the second spring 53, the third spring 54, which is spaced upward from the second spring 53, has one end connected to the extension 82 and the other end connected to the elevating member 20, so as to pull the operating lever 80 forward. When the horizontally movable member 60 is moved forward, the operating lever 80 is able to be moved forward by the elasticity of the third and second springs 54 and 53 provided at the upper and lower ends thereof. The other configurations of the present exemplary embodiment are the same as those of the above described first exemplary embodiment.

With the second exemplary embodiment as stated above, when the horizontally movable member 60 is moved rearward in accordance with a rotation of the pivot bracket 30, the operating lever 80 is pushed rearward by the horizontally movable member 60. In this case, the upper and lower ends of the operating lever 80 are moved rearward simultaneously, and in particular, the lower end of the extension 82 is introduced into the holder 14 to be caught by the holder 14. Conversely, when the horizontally movable member 60 is moved forward in accordance with rotation of the pivot bracket 30, the upper and lower ends of the operating lever 80 are pulled forward simultaneously by the elasticity of the second and third springs 53 and 54, thereby releasing the lower end of the extension 82 from the holder 14.

As apparent from the above description, the supporting device for a display unit according to the exemplary embodiments of the present invention may have the effects of allowing a display screen to be rotated so as to be oriented vertically, i.e. rotated vertically, only when an elevating member thereof is lifted, and restricting height regulation of the display screen when the screen is oriented vertically.

Further, the supporting device of the exemplary embodiments of the present invention include a horizontally movable member to move forward and rearward in accordance with rotation of a pivot bracket, and an operating lever to perform forward and rearward rotation or movement in accordance with behavior of the horizontally movable member. With the use of the horizontally movable member and operating member, the overall configuration of the supporting device can be simplified as compared to the prior art while achieving the above described functions with ease.

Although exemplary embodiments of the present invention have been shown and described, it would be appreciated by those skilled in the art that changes may be made to these exemplary embodiments without departing from the principles and spirit of the invention, the scope of which is defined in the claims and their equivalents.

What is claimed is:

1. A supporting device for a display unit comprising:
   a fixed member mounted on a base;
   an elevating member secured to the fixed member to be lifted or lowered;
   a pivot bracket rotatably connected to an upper end of the elevating member while being secured to a rear surface of the display unit;
   an operating lever having an upper portion rotatably coupled to the upper end of the elevating member;
   a holder formed at the fixed member to support the operating lever when the operating lever is rotated rearward in a lifted state of the elevating member;
   a horizontally movable member secured to the upper end of the elevating member and configured to move forward and rearward so as to rotate the operating lever; and
   a cam portion disposed on one of the pivot bracket and the display unit to cause the forward and rearward movements of the horizontally movable member when the pivot bracket is rotated.

2. The device according to claim 1, further comprising:
   a first spring to move the horizontally movable member toward the cam portion.

3. The device according to claim 1, wherein:
   the cam portion has a protruding surface protruded from a rear surface of the pivot bracket; and
   the horizontally movable member has a roller to perform a rolling motion while coming into contact with the protruding surface.

4. The device according to claim 1, wherein the holder further comprises:
   a holding space protruded rearward from an inner surface of an upper end the fixed member to allow a lower end of the operating lever to move rearward; and
   a supporting surface defining a bottom of the holding space to support the lower end of the operating lever.

5. The device according to claim 1, further comprising:
   a spring to move the operating lever in a direction of being released from the holder.

6. The device according to claim 4, further comprising:
   a spring to move the operating lever in a direction of being released from the holder.

7. The device according to claim 1, further comprising:
   a connecting member having a rear end secured to the upper end of the elevating member and adapted to pivotally rotate up and down about the upper end of the elevating member and a front end pivotally connected to the pivot bracket.

8. The device according to claim 7, wherein the rear end of the connecting member is adapted to pivotally rotate up and down about a pair of hinged shafts installed on the upper end of the elevating member to regulate a slant of the display screen and the front end of the connecting member is pivotally connected to the pivot bracket by use of a pivot shaft that is disposed in a direction intersecting with the hinge shafts.

9. The device according to claim 7, wherein the upper portion of the operating lever is rotatably coupled to the hinge shafts.

10. A supporting device for a display unit comprising:

a fixed member mounted on a base;

an elevating member secured to the fixed member to be lifted or lowered;

a pivot bracket rotatably connected to an upper end of the elevating member while being secured to a rear surface of the display unit;

an operating lever having an upper portion coupled to the upper end of the elevating member to allow forward and rearward movements of the operating lever and a lower portion extending downward by a distance;

a holder formed at the fixed member to support the operating lever when the operating lever is moved rearward in a lifted state of the elevating member;

a horizontally movable member secured to the upper end of the elevating member and configured to move forward and rearward so as to move the operating lever forward and rearward; and a cam portion disposed on the pivot bracket or the display unit to cause the forward and rearward movements of the horizontally movable member when the pivot bracket is rotated.

11. The device according to claim 10, further comprising:

a first spring to move the horizontally movable member toward the cam portion.

12. The device according to claim 10, wherein:

the cam portion has a protruding surface protruded from a rear surface of the pivot bracket; and the horizontally movable member has a roller to perform a rolling motion while coming into contact with the protruding surface.

13. The device according to claim 10, wherein the holder further comprises:

a holding space protruded rearward from an inner surface of an upper end the fixed member to allow a lower end of the operating lever to move rearward; and a supporting surface defining a bottom of the holding space to support the lower end of the operating lever.

14. The device according to claim 10, further comprising:

a connecting member having a rear end secured to the upper end of the elevating member and adapted to pivotally rotate up and down about the upper end of the elevating member and a front end pivotally connected to the pivot bracket.

15. The device according to claim 14, wherein the rear end of the connecting member is adapted to pivotally rotate up and down about a pair of hinged shafts installed on the upper end of the elevating member to regulate a slant of the display screen and the front end of the connecting member is pivotally connected to the pivot bracket by use of a pivot shaft that is disposed in a direction intersecting with the hinged shafts.

16. The device according to claim 15, wherein the operating lever has a pair of elongated longitudinal coupling slots formed in the upper portion thereof, to be coupled to the hinge shafts so as to move forward and rearward.

17. The device according to claim 16, further comprising:

a plurality of springs installed between the operating lever and the elevating member at positions spaced apart from each other so as to move the operating lever in a direction of being released from the holder.

* * * * *